US007936719B2

(12) United States Patent
Fajardo et al.

(10) Patent No.: US 7,936,719 B2
(45) Date of Patent: May 3, 2011

(54) PACKET LOSS PREVENTION DURING HANDOFF USING PACKET COPY-AND-FORWARD (75) Inventors: Victor Fajardo, Robbinsville, NJ (US); Yoshihiro Oba, Englewood Cliffs, NJ (US); Kenichi Taniuchi, Jersey City, NJ (US); Ashutosh Dutta, Bridgewater, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 628 days.

(21) Appl. No.: 11/379,565

(22) Filed: Apr. 20, 2006

(65) Prior Publication Data
US 2007/0248049 A1 Oct. 25, 2007

(51) Int. Cl.
*H04W 4/00* (2009.01)
*H04W 36/00* (2009.01)
(52) U.S. Cl. ........ 370/331; 370/310; 370/328; 370/338; 455/436; 455/437; 455/442
(58) Field of Classification Search .................. 370/331, 370/312, 328, 338, 236; 455/517, 436, 437, 455/442, 452.2
See application file for complete search history.

(56) References Cited

U.S. PATENT DOCUMENTS

| | | | | |
|---|---|---|---|---|
| 5,184,347 | A * | 2/1993 | Farwell et al. | 370/350 |
| 6,246,878 | B1 * | 6/2001 | Wallentin | 455/442 |
| 2003/0063585 | A1 * | 4/2003 | Younis et al. | 370/331 |
| 2003/0176187 | A1 | 9/2003 | Menzel et al. | |
| 2004/0248583 | A1 * | 12/2004 | Satt et al. | 455/452.2 |
| 2005/0213540 | A1 * | 9/2005 | Matsumoto | 370/331 |
| 2006/0018283 | A1 * | 1/2006 | Lewis et al. | 370/331 |
| 2006/0052107 | A1 * | 3/2006 | Isobe et al. | 455/436 |
| 2006/0120328 | A1 * | 6/2006 | Wright et al. | 370/331 |
| 2006/0146814 | A1 * | 7/2006 | Shah et al. | 370/389 |
| 2006/0240825 | A1 * | 10/2006 | Funabiki et al. | 455/436 |
| 2007/0008885 | A1 * | 1/2007 | Bonner | 370/230 |
| 2007/0008927 | A1 * | 1/2007 | Herz et al. | 370/331 |
| 2007/0072612 | A1 * | 3/2007 | Haraguchi et al. | 455/436 |

(Continued)

FOREIGN PATENT DOCUMENTS
EP 1443715 A1 8/2008
(Continued)

OTHER PUBLICATIONS

N. Moore, Tunnel Buffereing for Mobile IPv6, Jul. 9, 2004, p. 1-11, Internet Draft, USA.

(Continued)

*Primary Examiner* — Huy Phan
(74) *Attorney, Agent, or Firm* — Watch Stone P+D, PLLC (57) ABSTRACT

The present invention relates to the handing off without packet loss, from a mobile device traveling from a current point of attachment to a new point of attachment, by providing a copy and forward module in association with the current point of attachment. The copy and forward module copies and stores packets that are being transmitted to a mobile node while the mobile node is in transition from the current point of attachment to the new point of attachment. The copy and forward module maintains a list of addresses as the last known contact addresses of the mobile node, and the mobile node's initial copy request contains an initial contact address of the mobile node. Subsequent copy requests are used to add or delete addresses to the list, and carry a per-address flag to indicate whether the address is to be added or deleted from the list.

25 Claims, 4 Drawing Sheets

U.S. PATENT DOCUMENTS

| | | | |
|---|---|---|---|
| 2007/0162553 A1* | 7/2007 | Dewing et al. | 709/207 |
| 2007/0165574 A1* | 7/2007 | Srey et al. | 370/331 |
| 2007/0171938 A1* | 7/2007 | Sohn et al. | 370/466 |
| 2007/0217364 A1* | 9/2007 | Kawakami | 370/331 |
| 2007/0297370 A1* | 12/2007 | Shimizu et al. | 370/331 |
| 2009/0003280 A1* | 1/2009 | Kasapidis | 370/331 |

FOREIGN PATENT DOCUMENTS

| | | |
|---|---|---|
| JP | 2002-152254 A | 5/2002 |

OTHER PUBLICATIONS

R. Koodli, Fast Handovers for Mobile IPv6, Oct. 25, 2004, p. 1-53, Internet Draft, USA.

C. Lee, Seamless MPEG-4 Video Streaming Over Mobile IP-enabled Wireless LAN, 2004, p. 1-6, Korea.

C. Perkins, IP Mobility Support for IPv4, Oct. 20, 2005, p. 1-12, Internet Draft, USA.

D. Johnson, Mobility Support in IPv6, Jun. 2004, p. 1-155, The Internet Society, USA.

A. Dutta, A Framework of Media-Independent Pre-Authenthication for Inter-domain Handover Optimization, Feb. 25, 2008, p. 1-57, Internet Draft, USA.

D. Forsberg, Protocol for Carrying Authentication for Network Access, Jul. 11, 2005, p. 1-2, Internet Draft, USA.

M. Khalil, "Buffer Management for Mobile IP", Internet-Draft, Oct. 1999, p. 1-20, The Internet Society, USA.

G. Krishnamuthi, "Buffer Management for Smooth HandOvers in Mobile IPv6", Internet Draft, Jul. 2000, p. 1-27, The Internet Society, USA.

C. Perkins, "Optimized smooth handoffs in Mobile IP", Proceedings of IEEE Symposium on Computers and Communications, Jul. 1999, p. 1-7, USA.

International Preliminary Report on Patentability dated Oct. 22, 2008 of International Application No. PCT/JP2007/058991.

Japanese Office Action dated Feb. 15, 2011, issued in corresponding Japanese Patent Application No. 2008-549700. (partial English Translation).

European Office Action dated Mar. 8, 2011, issued in corresponding European Patent Application No. 07742426.5.

* cited by examiner

PACKET LOSS PREVENTION DURING HANDOFF USING PACKET COPY-AND-FORWARD

BACKGROUND

1. Field of the Invention

The present application relates to wireless networking and, in some preferred embodiments, to methods of preventing packet loss during handoff of a mobile device between neighboring networks and/or the like.

2. General Background Discussion

1. Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

IP (Internet Protocol) is a protocol by which data can be sent from one device (e.g., a phone, a PDA [Personal Digital Assistant], a computer, etc.) to another device on a network. IP is a connectionless protocol. Today there are varieties of versions of IP, including, e.g., IPv4, IPv6, etc. Each host device on the network has at least one IP address that identifies the host device's point of attachment to the IP networks. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point, and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router, or a workstation. Messages destined for some other host are not passed up to the upper layers but are forwarded to the other host. In the OSI and other similar models, IP is in Layer-3, the network layer. The layers of the OSI model are listed below. Layer 7 (i.e., the application layer) is a layer at which, for example, communication partners are identified, quality of service is identified, user authentication and privacy are considered, constraints on data syntax are identified, and the like. Layer 6 (i.e., the presentation layer) is a layer that, for example, converts incoming and outgoing data from one presentation format to another, and the like. Layer 5 (i.e., the session layer) is a layer that, for example, sets up, coordinates, and terminates conversations, exchanges and dialogs between the applications. Layer-4 (i.e., the transport layer) is a layer that, for example, manages end-to-end control and error checking, and the like. Layer-3 (i.e., the network layer) is a layer that, for example, handles routing and forwarding, and the like. Layer-2 (i.e., the data-link layer) is a layer that, for example, provides synchronization for the physical level, does bit-stuffing and furnishes transmission protocol knowledge and management, and the like. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer, interprets commands, and performs error recovery. Layer 1 (i.e., the physical layer) is a layer that, for example, conveys the bit stream through the network at the physical level. The IEEE sub-divides the physical layer into the PLCP (Physical Layer Convergence Procedure) sub-layer and the PMD (Physical Medium Dependent) sub-layer.

Typically, layers higher than layer-2 (such as, for example, layers including the network layer or layer-3 in the OSI model and the like) is referred to as the higher-layers.

2. Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, for example, a single chip transceiver with an integrated transmitter, receiver and, if desired, other functions); an antenna; a processor; one or more audio transducers (for example, a speaker or a microphone as in devices for audio communications); electromagnetic data storage (such as, for example, ROM, RAM, digital data storage, and the like, such as in devices where data processing is provided); memory; flash memory; a full chip set or integrated circuit; interfaces (such as, for example, USB, CODEC, UART, PCM, etc.); and/or the like.

Wireless LANs (WLANS) in which a mobile user can connect to a local area network (LAN) through a wireless connection may be employed for wireless communications. Wireless communications can include, for example, communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, for example, a BDN, a BDA, an IP address, and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two or more independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their initially assigned IP Address. Mobile IP enhances Internet Protocol (IP) and adds a means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, as for example, the Internet Control Message Protocol (ICMP).

In basic IP routing (i.e. outside mobile IP), typically, routing mechanisms rely on the assumptions that each network node always has a constant attachment point to, for example, the Internet and that each node's IP address identifies the network link to which it is attached. As used herein, the terminology "node" includes a connection point, which can include, for example, a redistribution point or an end point for data transmissions, and which can recognize, process and/or forward communications to other nodes. For example, Internet routers can look at, for example, an IP address prefix, or the like, identifying a device's network. Then, at a network level, routers can look at, for example, a set of bits identifying a particular subnet. Then, at a subnet level, routers can look at, e.g., a set of bits identifying a particular device. With typical mobile IP communications, if a user disconnects a mobile device from, for example, the Internet and tries to reconnect it at a new subnet, then the device has to be reconfigured with a new IP address, a proper netmask, and a default router. Otherwise, routing protocols would not be able to deliver the packets properly.

3. Handoffs of Mobile Devices

In the context of, for example, a mobile device with an IP-based wireless network interface (such as, e.g., an IEEE 802.11 or an 802.16 interface), the mobile device needs to perform roaming or handoffs when it moves from one network into another network. With existing handoff methodologies, handoff is typically accomplished by performing the following sequence of protocol layer specific handoffs:

First, handoff takes place at the physical layer. In this regard, the mobile device switches its radio channel to, e.g., a wireless base station or wireless access point in the target network.

Second, handoff takes place at layer-2. In this regard, the mobile device switches its layer-2 (i.e., link-layer) connections to the target network. As explained above, the link layer or layer-2 refers to the protocol immediately below the IP-layer that carries user traffic. The mobile device performs layer-2 authentication with the target network if the target network requires such authentication.

Third, handoff takes place at the IP-layer. In this regard, the mobile device obtains a local IP address from the target network, performs IP-layer authentication if required by the target network, and then performs IP-layer location update so that IP packets destined to the mobile device can be routed by the IP network to the mobile device via the target network. In some instances, one way to support IP layer location update is to use Mobile IP defined by the Internet Engineering Task Force (IETF).

Forth, handoff takes place at the application-layer. The mobile device performs necessary steps at the application layer to ensure that its application traffic will flow correctly to the applications on the mobile device via the target network. For example, when the mobile device uses the Session Initiation Protocol (SIP) defined by the IETF to manage its application-layer signaling, an application layer handoff can be achieved by the mobile device updating its current location with its home SIP server. The mobile device may also need to carry out application-layer authentication with the target network if required by the target network. This is the case, for example, when the mobile device is using the IP Multimedia Subsystem (IMS) in a visited 3GPP ($3^{rd}$ Generation Partnership Project) wireless network, where the IMS is a SIP-based system supporting application-layer signaling and management for multimedia applications over 3GPP networks. Sometimes, either IP-layer handoff or application-layer handoff is sufficient. That is, it may be unnecessary to perform both IP-layer and application-layer handoff. These existing methods can lead to significant handoff delays when they are used in IP-based wireless networks. For example, in a geographical region where there are many wireless local area networks (WLANs) such as in cities, inside building complexes or residential homes, or in other public places where multiple wireless LANs exist, a mobile device may receive strong radio signals from multiple radio networks at the same time. However, the mobile device may not be authorized to use some of these radio networks.

Under the existing handoff methods described above, a mobile device will select a target network based on, for example, radio signal strengths, and will go through the steps described above to connect to the target network and then discover, for example, if it is authorized to use the network or if the network does not provide the capabilities (e.g., sufficient available bandwidth) or the services that the mobile device needs. Consequently, the mobile device will have to try to connect to another network, and will repeat this process until it finally connects to a network that provides, and that allows it to use, the capabilities and services it needs (or until it has exhausted all possible networks). Accordingly, with existing systems, a handoff can take a long time that can be intolerable and can delay sensitive applications such as, as some examples, live voice, and/or video applications.

While a variety of systems and methods are known, there remains a need for, among other things, improved systems and methods for performing handoffs in wireless networks.

SUMMARY OF THE INVENTION

A broad aspect of the preferred embodiments of the present invention is the preventing packet loss when a mobile node (MN) is in the midst of a handoff.

One illustrative broad aspect of some of the preferred embodiments of the present invention is the handoff without packet loss, from a mobile device traveling from a current point of attachment to a new point of attachment, by providing a copy and forward module in association with the current point of attachment. The copy and forward module makes copies of packets that are being transmitted to a mobile node and stores them on behalf of the mobile node while the mobile node is in transition from the current point of attachment to the new point of attachment.

Another broad aspect of some of the preferred embodiments of the present invention is the receipt by a copy and forward module of a forward request while it continues to receive and forward newly arrived packets for the mobile node. The copy and forward module forwards packets stored in the buffer at a higher priority than the priority set for newly arrived packets.

Another broad aspect of some of the preferred embodiments of the present invention is the copying by the copy and forward module of packets destined for the mobile node prior to handoff, and the forwarding of the copied packets to the mobile node when handover is completed and the mobile node is reachable in a new point of attachment network.

Another aspect of some of the preferred embodiments is the copy and forward module maintaining a list of addresses as the last known contact addresses of the mobile node, and the mobile node's initial copy request containing an initial contact address of the mobile node. Subsequent copy requests are used to add or delete addresses to the list, and carry a per-address flag to indicate whether the address is to be added or deleted from said list, Another aspect of some of the preferred embodiments defines the copy and forward module bi-casting packets to both the current point of attachment and the new point of attachment of the mobile node.

Another aspect of some of the preferred embodiments is the mobile node requesting copy and forward service from the current point of attachment, and the current point of attachment sending a copy request signal to the copy and forward module, thereby signaling the intent to use copy and forward service prior to handoff. Upon receiving the copy request, the copy and forward module determines whether it will be able to accommodate said mobile node's request. If it is able to accommodate the copy request, it commences to classify and copy packets destined for the mobile node on the current point of attachment. The copy and forward module sends a copy response to the mobile node notifying the mobile node of said copy and forward module's intent to either provide or to not provide service to said mobile node, and the current point of attachment forwards original packets to the mobile node, irrespective of whether the copy and forward module is able to accommodate the copy request.

Another aspect of some of the preferred embodiments is the mobile node sending a plurality of copy requests to the current point of attachment and the copy and forward module bi-casting packets to a plurality of points of attachment. In this disclosure, the term "bi-casting" is not limited to casting to two points of attachment (e.g., it encompasses casting to more than two points) or last known contact addresses.

Another aspect of some of the preferred embodiments is the copy response signal containing an Id parameter generated by the copy and forward module to uniquely identify each mobile node for which said copy and forward module can providing service.

Another aspect of some of the preferred embodiments is the mobile nodes sending a service termination request signal to terminate copy and forward service and the termination request signal being used during flushing and forwarding to indicate to the copy and forward module that the mobile node has received enough packets and that the copy and forward module is to terminate the copy and forward service.

Another aspect of some of the preferred embodiments is the current point of attachment network continuing to receive packets for the mobile node after successful handover has occurred and a forward request has been sent by said mobile node to the copy and forward module. The copy and forward module continues to classify and copy packets and copied packets as well as any newly arrived packets are forwarded to a new contact address provided by the mobile node in the forward request. The classifying, copying, and forwarding continues until the copy and forward module receives a terminate request or upon expiration of a predetermined service expiration period of time.

Another aspect of some of the preferred embodiments defines the maximum number of packets that can be stored in a packet buffer in the copy and forward module as a number sufficiently large to accommodate the mobile node moving a plurality of times subsequent to moving from said current point of attachment to a new point of attachment. The storage limit to the packet buffer is also used to manage the limited resources in the entity providing copy and forward service considering that multiple mobile node can simultaneously use the service. The buffer is a first-in, first-out buffer which, when full the receipt of new packet that need to be copied results in the eldest packets being discarded to make room for new packets, such that said packet buffer always contain the latest set of packets for said mobile node, up to the maximum number of packets.

Another aspect of some of the preferred embodiments defines stored packets including sequencing information. The mobile node determines the sequence number of the last received packet while in the current point of attachment network and provides this information in association with the forward request to the copy and forward module. The copy and forward module forwards packets starting from the last received packet plus one, and discards packets that are less than the sequence number of the last received packet.

Another aspect of some of the preferred embodiments defines detecting by the mobile node of whether packet loss has occurred up to the sequence number of the last received packet. The mobile node sends to the copy and forward module a forward request including a list of missing packets with sequence numbers less than the sequence number of the last received packet in the forward request. The copy and forward module then sends a set of missing packets in addition to packets with sequence numbers greater than the sequence number of the last received packet during forwarding.

Another aspect of some of the preferred embodiments defines detecting by the copy and forward module of whether duplication of packets has occurred up to the sequence number of the oldest packets in the buffer as a consequence of copying. The mobile node sends to the copy and forward module a forward request the sequence number of the last received packet in the forward request. The copy and forward module then sends packets with sequence numbers greater than the sequence number of the last received packet during forwarding.

The above and/or other aspects, features and/or advantages of various embodiments will be further appreciated in view of the following description in conjunction with the accompanying figures. Various embodiments can include and/or exclude different aspects, features, and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Introduction to the Preferred Embodiments

The following abbreviations are employed herein: Mobile node (MN); Correspondent node (CN); Access Router (AR); Current Point of Attachment (CPA); Copy and Forward (CPFW); New Point of Attachment (NPA); copy-and-forward (CPFW); threshold, THOLD); first-in, first-out (FIFO); New Point of Attachment (NPA); Copy request (CPR); distributed system (DS); Real-time Transport Protocol (RTP); sequence number of the last receive packet (LSEQ); missing packets with sequence numbers less than LSEQ (Missing-SEQ); —List of current contact addresses of the MN in the CPA or NPA (ADDRS); layer protocols such as STP (Mn-link); spanning-tree-protocol (STP); and, Internet Service Providers (ISPs).

DEFINITIONS

MN—Mobile node that is expected to move from one point of attachment to another and still maintain IP reachability after each movement. An example would be an 802.11 non-AP STA that uses IP mobility (Mobile IPv4/IPv6) for mobility management.

CN—Correspondent node is a peer node to the MN. Both nodes have corresponding applications that communicate with each other.

AR—Access Router is a router residing in the edge of an access network.

CPA—Current Point of attachment is an access node or device that the MN interface associate with, i.e. access point, base station, bridge, etc. The MN interface is the interface involved in the handoff.

NPA—New Point of attachment. Has the same meaning as CPA but denotes the network that the MN is moving towards. Also known as candidate or target network.

CPFW—Packet copy-and-forward module as proposed in this document.

Handoff—An act of a MN to switch from CPA to NPA.

Handover—Procedure taken by each communication layer at a handoff event to establish or modify necessary state required by that layer.

1. Background

The preferred embodiments improve upon the follow and/or other background information. Each of the following documents is incorporated herein-by-reference in its entirety:

[1] Moore, N., Choi J., Pentland Bret, "Tunnel Buffering for Mobile IPv6", IETF, draft-moore-mobopts-tunnel-buffering-00.txt, July 2004.

[2] Khalil, M., Akhtar H., Qaddoura E., Perkins C., Cerpa A., "Buffer Management for Mobile IP", IETF, draft-mkhalil-mobileip-buffer-00.txt, October 1999

[3] R. Koodli, ""Fast Handovers for Mobile IPv6"", IETF draft-ietf-mipshop-fast-mipv6-03.txt, October 2004.

[4] Krishnamurthi G., Chalmers R., Perkins C., ""Buffer Management for Smooth HandOvers in Mobile IPv6"", IETF, draft-krishnamurthi-mobileip-buffer6-00.txt, July 2000

[5] Chul-Ho Lee, Dongwook Lee, JongWon Kim, ""Seamless MPEG-4 Video Streaming over Mobile IP-enabled Wireless LAN"", Network Research Workshop 2004/18th APAN meeting

[6] Perkins C., Wang K-Y., "Optimized smooth handoffs in Mobile IP", Proceedings of IEEE Symposium on Computers and Communications, July 1999

[7] Perkins C., "IP Mobility Support for IPv4, revised", IETF, draft-ietf-mip4-rfc3344bis-02.txt, October 2005

[8] Johnson D., Perkins C., Arkko J., "Mobility Support in IPv6", IETF, RFC 3775, June 2004

[9] Fajardo V., Ohba Y., Dutta A., Tanuichi K., "Dynamic Packet Buffering Scheme for Mobile Handoff", TARI Ref. No. 05-14-P-US, June 2005

[10] Velayos H., Karlsson G., "Techniques to reduce IEEE 802.11b MAC layer handover time", KTH Royal Institute of Technology, April 2003

[11] Fajardo V., Ohba Y., Tanuichi K., Dutta A. "Fast Link-Down Detection Technique", TARI Ref. No. [TBD . . . ], January 2006

[12] Ohba Y., Dutta A., Fajardo V., Tanuichi K., "A Framework of Media-Independent Pre-Authentication (MPA)", draft-ohba-mobopts-framwork-00.txt, IETF/IRTF Mobopts Research Group, July 2005

[13] Forsberg D., Ohba Y., Patil B., Tschofenig H., Yegin A., "Protocol for Carrying Authentication for Network Access (PANA)", draft-ietf-pana-pana-10.txt, IETF, PANA Working Group, July 2005

[14] Aguayo D., Bicket J., Biswas S., Judd G., Morris R., "Link Level Measurement for 802.11b Mesh Networks", MIT Computer Science and Artificial Intelligence Labs, June 2004

In an IP network where mobility needs to be supported, it is expected that IP traffic traversing the access network towards the MN will be lost when a mobile moves from the current point of attachment (CPA) to a new point of attachment (NPA). It has now been found that packet loss can be prevented by using a copy and forward (CPFW) buffer somewhere inside the current point of attachment. The CPFW will be responsible for buffering packets going towards the MN while the MN is in the midst of a handoff.

An MN performing a handoff is not able to transmit or receive packets in the absence of link-layer connectivity via any interface during the handoff, and this can cause loss of packets during the handoff period. Packet loss prevention during such a handoff is needed for specific applications, such as voice over IP, that are not tolerant of information loss.

There are existing proposals that attempt to provide a solution to the problem of packet loss, by providing packet buffers as part of the mobility management protocol ([1], [2], [3] and [4]). In these proposals, packets that can potentially be lost during handoff are buffered in an AR participating in the mobility protocol. Signaling of buffer requirements, as well as the buffers themselves, are internal to the protocol (Mobile IPv4/IPv6). Therefore, the solution is not generic and is non-existent in systems and access networks that do not support these protocols. Furthermore, these techniques assume that the buffering node has knowledge of the beginning and end of the handoff period based on detecting unavailability (link-down) of the current interface (link-down) and availability (link-up) of the new interface, respectively. However, detection of a link-down is known to take time [14] compared to detection of a link-up because an additional procedure such as a liveness test for the current point of attachment as well as gathering signal strength samples, is needed to avoid false detection of link-down. The delay in link-down detection results in a delay on the start of packet buffering at the buffering node and hence potential packet loss.

Another issue is that a link-down can occur at any time in wireless environments in general [11], which makes it difficult to anticipate when a link-down will occur. Thus, a predictive approach in which a MN sends a signaling message to start buffering when a link is going down is also not applicable.

As an alternative to existing proposals, the present system provides a generic mechanism of providing packet copy-and-forward (CPFW) services at the CPA network. CPFW service is an access network service similar to packet buffering of [1], [2], [3] and [4]. The CPFW must reside on the AR to which are packets are going as the MN traverses from a CPA to an NPA. The present system differs from existing proposals, as follows:

a. The use of CPFW provides an independent and generic solution. It is also flexible enough to be integrated into existing systems such as ARs, access points, home agents, etc.

b. Packets destined for the MN are copied and not buffered. This means the CPFW service does not keep the packets on behalf of the MN during the handoff period. Instead the CPFW makes copies of the packets and allow the packets to flow or be routed as normal during the handover period.

c. Copy-and-forward is independent of link-down and link-up indications. It depends only on the policies defined in the MN. These policies translate to commands that are signaled to the CPFW service.

d. Forwarding does not involve complex IP tunneling mechanism. Instead the destination IP address of the copied packets is changed to the MN's IP address at its NPA. Details of the forwarding mechanism are described in later sections.

c. Signaling is simple and generic. It is limited to the MN and the AR providing CPFW service. Details of the forwarding mechanism are described in later sections.

There are additional benefits provided by a CPFW service. Packet loss due to ping-pong effects can be lessened when the CPFW bi-casts the packets to both CPA and NPA networks, rather than only the NPA. Additionally, scalability issues can be addressed by distributing multiple CPFW services in the CPA network. Each CPFW nodes is independent of each other and serves different MNs. Further details are described in subsequent sections.

The CPFW system is derived from a previous art described in [9], which describes a buffering technique to prevent packet loss in a very generic and flexible manner. But item (b) enumerated above still holds true when [9] is compared against CPFW.

2. Architecture

A general architectural overview of the CPFW service is described in this section.

2.1. General Description

Figure 1:
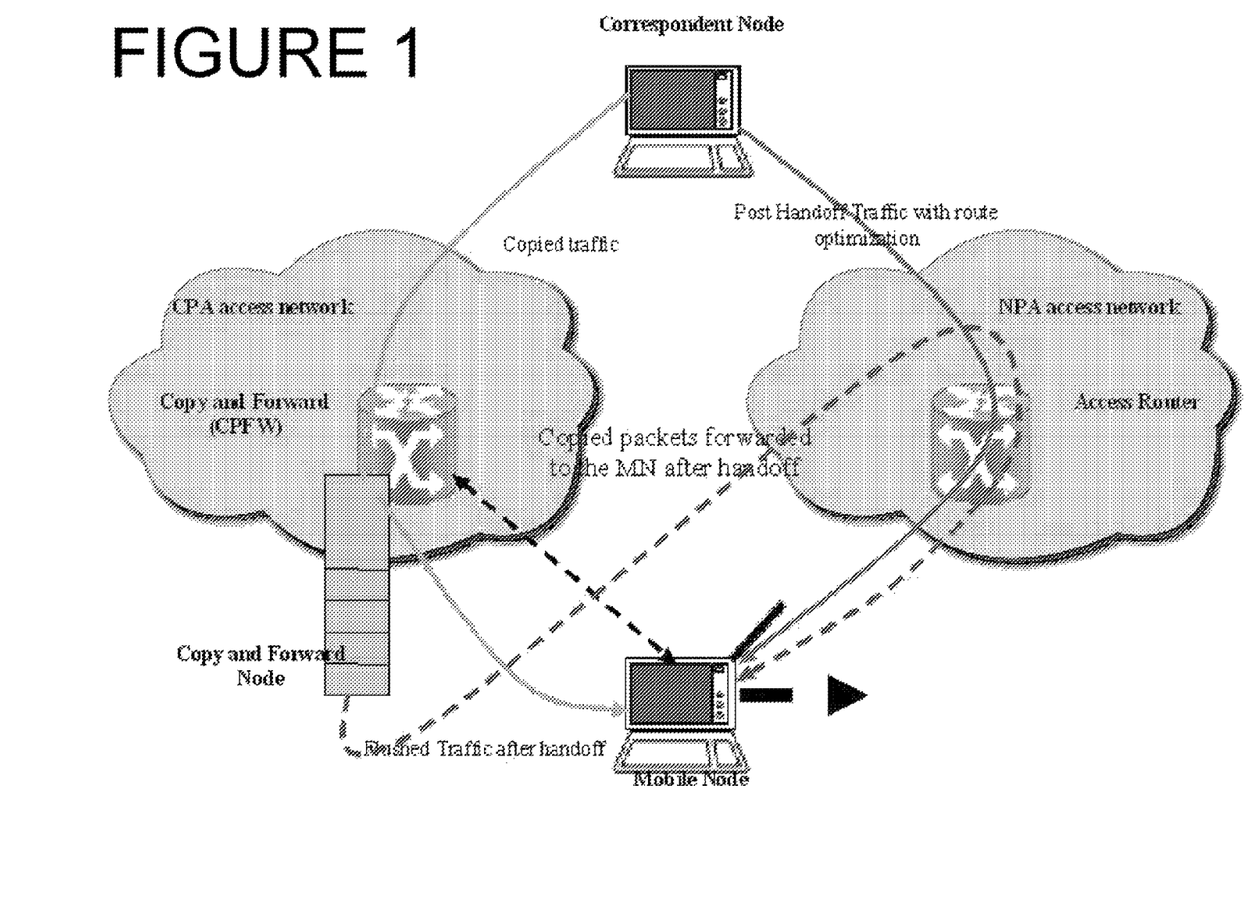
FIG. 1 is a diagrammatic representation of a basic deployment scenario when a copy and forward system resides in the access router.

The basic use of the CPFW is to copy packets destined for the MN prior to handoff and then forward the copied packets to the mobile node when handover is completed and the MN is reachable in the NPA network. A basic deployment scenario when CPFW resides in AR is shown in FIG. 1.

An MN that requests CPFW service from the CPA network signals the CPFW node of its intent to use the CPFW service prior to handoff. This signal is referred to as a copy request (Sec 3.2.1). Upon receiving the copy request, the CPFW node determines whether it will be able to accommodate the MN's request. If it is able to accommodate the request, then the CPFW node will start to classify and copy packets destined for the MN on the CPA (Sec 2.2). The CPFW notifies the MN of its intent to provide or to not provide service by sending an acknowledgement to the MN. The acknowledgement is referred to as copy response (Sec 3.2.2). This process does not stop the original packets from being forwarded to the MN in the CPA. More that one copy request may be sent in the case that the MN wishes to have bi-casting support to aid in the event of possible ping-pong effects. Details of this process are found in (Sec 2.4.2).

If the copy-and-forward service can be accommodated by the CPFW node, then the copy response signal contains an Id parameter (Sec 3.2.4) generated by the CPFW node to uniquely identify each MN for which it is providing service. The MN can use this Id in subsequent request messages to identify itself to the CPFW. If the copy-and-forward service cannot be provided, then this parameter is not included in the copy response.

The limit to the amount of packets copied (threshold, THOLD) is based on the estimated time it takes for the MN to complete the handover (Sec 2.3). The THOLD information can be included in the initial copy request sent by the MN since it can provide a better estimate for THOLD, or in some cases, THOLD can also be a pre-configured value in the CPFW node. Once the MN has completed handover and reachable in the NPA, it sends another signal to the CPFW node to forward copied packets to its new location (Sec 2.4). This signal is referred to as a forward request (Sec 3.2.2).

Upon receiving the forward request, the CPFW node can forward the copied packets to the MN in the NPA. The new contact address of the MN is also included in the forward request so that the CPFW node knows where to send the copied packets. The CPFW node also notifies the MN that it has received the forward request by sending a forward response signal to the MN. The receipt of a forward request not only allows forwarding of the copied packets, but also allows forwarding of any newly arrived packets that may still be sent to the MN via the CPA (Sec 2.4.1). This provides a grace period for left over packets destined for the MN to be forwarded to the NPA until such time that the service is terminated.

A third signal can also be used to terminate the CPFW service. This signal is referred to as a terminate request. In general, a terminate request can be used explicitly by the MN to end the CPFW service. It can also be used in the midst of flushing and forwarding (Sec 3.1.3) to indicate to the CPFW node that it has received enough packets and that the CPFW node should stop forwarding and should terminate the service. Details of this feature are defined in 3 and 3.2.3. As with other requests, a response signal is sent by the CPFW node to acknowledge receipt of the request. This signal is referred to as a terminate response.

The present architecture provides for all of the resources expended for the service including, state information, being allocated by the CPFW node for each MN. The MN is responsible only for signaling its intent to use the service and therefore it does not have to keep any state information other that the Id it received in the initial copy response signal. The present architectures also provides for the CPFW node to make a mapping of each classifiers and packet buffers with each MN using the Id. The techniques used to generate the Id are left to the implementation.

2.2. Packet Classification

An access network that provides CPFW service can have one or more nodes that are capable of classifying MN traffic. A general method of implementation of packet classification is to match the destination IP or Mac address of the packets traversing the CPA network to that of the MN. The method is also dependent upon the residence location of the CPFW nodes AR, access point, base station, bridge etc). The method can also the application port numbers or source IP addresses. These classifier(s) can therefore be made application aware and may conform the CPFW service to a set of application data. These systems are administratively dependent but can also be provided by the MN during the copy request (Sec 3.2.1). The location of the classifier(s) must be carefully considered in the CPA network. At the least, they must be in a network node in which traffic for the MN traverses. Normally, these would be access routers in the CPA network that can inspect traffic destined for the mobile node. Consequently, the classifiers can influence the CPFW node as to which packet to copy and store.

2.3. Packet Copying

A packet that passes classification must be copied to packet buffers in the CPFW node. Packet buffers are allocated per MN and have a size limit equal to or greater than THOLD packets. THOLD is the maximum number of packets that can be stored in a buffer. The buffer is a FIFO (first-in, first-out) buffer so if it is full (there are already THOLD packets in the buffer), any new packet that needs to be copied will result on the eldest packet being discarded to make room for the new packet. This means that the packet buffer will always contain the latest set of packets for the MN up to THOLD amount.

The value for THOLD should be estimated based on the time it takes for the MN to complete the handover and the traffic rate of the classified packets. In normal conditions, traffic rate for a specific set of time is difficult to determine unless one has some knowledge of the application(s) generating the traffic. As such, the MN is best able to provide THOLD information since it is hosting the application(s) in question. Therefore, initial MN signaling request for CPFW service (copy request, Sec 3.2.1) can include THOLD hints or recommendations. However, the CPFW service will ultimately decide on the value of THOLD taking into account the MN hints, availability of resources, local scalability policies etc. In some cases, such as ping-pong effects, THOLD values should be large enough to span multiple handovers. Details of this scenario can be found in Sec 2.4.2.

Providing packet buffers per MN can have some scalability issues. In general, solutions to such issues are known and a majority of such solutions are implementation specific. An example could be to distribute CPFW nodes to several systems in the access network thereby distributing load. This can give rise to complexities with regards to managing the traffic path of each MN.

2.4. Forwarding

Once an MN is reachable in the NPA, packets stored in the CPFW service of the CPA network will need to be forwarded to the MN. The MN explicitly signals the CPFW node of this event using a forward request. In general, explicit signaling is required to convey to the CPFW the current new contact address of the MN, i.e. the MNs IP address in the NPA network. This is common when using IP mobility management protocol where the new IP address of the MN is known only after handover is completed.

In addition to the contact address specified in the forward request, the CPFW node can also maintain a list of addresses as the last known contact addresses of the MN when bi-casting is supported. These addresses can be used for bi-cast newly arrived packets to the MNs known point of attachments. (Sec 2.4.2). The initial copy request may contain the initial contact address of the MN and can be used to build the MNs contact address list. Subsequent copy requests can be used to add or delete addresses to this list. The address list contained in a subsequent copy request can carry a per-address flag to indicate whether the address is to be added or deleted to the list. Other schemes can also be used to maintain the MNs contact list. The details can be left to the implementation. It should be noted, however, that in forwarding of copied packets, only the contact address contained in the forward request is used since it is assumed that a forward request is sent only when the MN knows it has a stable connection in the NPA. Details can be found in Sec 2.4.2.

The receipt of a forward request does not constitute an end of CPFW service. It merely indicates that copied packets need to be flushed and forwarded to the new MN contact address (or list of contact addresses, Sec 2.4.2) provided in the request. An explicit terminate request is required to stop the service and discard any buffered packets. If a terminate request is received after a forward request, and the CPFW is in the midst of forwarding copied packets, the CPFW should immediately stop forwarding and discard any remaining packets in the buffer. This method is useful in the case that the MN has decided that it has received all the packets it is known to have missed and thus prevent packet duplication (Sec 2.4.3). In the absence of a terminate request, a service expiration (TSVC) timer is used to indicate that the handoff has failed. Expiration of TSVC will have the same effect as a receipt of a terminate request. TSVC should represent the maximum duration that applications in the MN can tolerate un-reachability.

There is also an optional functionality that can be used when forwarding takes into account any sequencing information that the packets carry. This sequencing information is useful for avoiding packet duplication during forwarding. It can also lessen the number of packets that needs to get forwarded. Details are provided in Sec 2.4.3.

2.4.1. Forwarding Priority and Post Handoff Packets in the CPA Network

After receipt of a forward request and while forwarding packets, the CPFW node can continue to receive packets for the MN. In such a case, the CPFW node must be able to forward the packets stored in the buffer at a higher priority than any newly classified packets. This is done in order to maintain packet ordering at the MN. It is left to the implementation on how to accomplished prioritization of packets.

In some circumstances, the CPA network may continue to receive packets for the MN even after successful handover has occurred. This may be due to a signaling delay in the mobility management protocol, i.e. delay on sending and processing binding updates ([7] and [8]). Therefore, a receipt of a forward request does not constitute an end to classifying and copying (Sec 3.1.2). It only indicates that all copied packets as well as any newly arrived packets should be forwarded to the new contact address provided in the request. Once all copied packets have been forwarded, the CPFW node should continue to perform classifying and copying as normal. This enables the MN to continue receiving packets from the CPA network that would otherwise have been discarded. Classifying and copying should terminate only upon receipt of a terminate request or expiration of the TSCV (Sec 2.4).

2.4.2. Ping-Pong Effect

A Ping-pong effect is a failed or unstable attempt of an MN to handoff to the NPA and as a consequence can end up re-associating back and forth between NPA and CPA. This effect maybe due to the instability of the link-layer medium though its details are out of scope for this document. The CFPW can aid in this issue by bi-casting MN traffic to both CPA and NPA networks during handoff. To provide a suitable bi-casting scheme, the following is required:

a. The CPFW node requires both the MNs old contact addresses (address in the CPA) and new contact address (address in the NPA).

b. All newly arrived packets will be forwarded to both CPA and NPA once (a) is satisfied.

c. All copied packets will be flushed and forwarded to the MN once it has stabilized its connection either in the NPA or CPA.

The net effect of following this procedure is to provide the MN with the opportunity to receive all of the packets while it's in the midst of a ping-pong event.

An MN preparing for a possible ping-pong event can follow the CPFW process as normal (Sec 2.1). It sends an initial copy request to the CPFW node to initiate the CPFW service and start classifying and copying (Sec 3.1.2), and also to indicate the MNs current contact address.

Once the first handover is completed and the MN has attached itself to NPA and obtained a new contact address (valid only in IP based CPFW), it can send a another copy request to notify the CPFW node of the new contact address. The subsequent copy request is an indication to the CPFW that the MN wishes to have bi-casting support. The CPFW can then start maintaining a list of contact addresses for the MN (Sec 2.4). This satisfies requirement (a). Also, upon receiving the copy request, the CPFW node can begin to forward all newly arrived packets to all known contact addresses. This satisfies requirement (b). If the MN enters a ping-pong event and moves from NPA to CPA, it can expect that any newly arrived packets will be present in the CPA. If the MN where to move to another point of attachment other than the NPA or CPA, it can send additional copy request to notify the CPFW node of its new contact address in the current point of attachment. Once the MN stabilizes its connection whether in the CPA, NPA, or some other point of attachment, it can simply send a forward request to the CPFW node and flush all copied packets to the current location. This satisfies requirement (c). Note that the copied packets will be forwarded only to the contact address specified in forward request since it is assumed that the MN has a stable connection in its current location. For optimization purpose, there will be no need to bi-cast the copied packets to the contact list maintained in the CPFW node. Note also, that the value of THOLD should be large enough to accommodate ping-pong events. It should encompass all the movements that can occur in such scenario.

Figure 2:
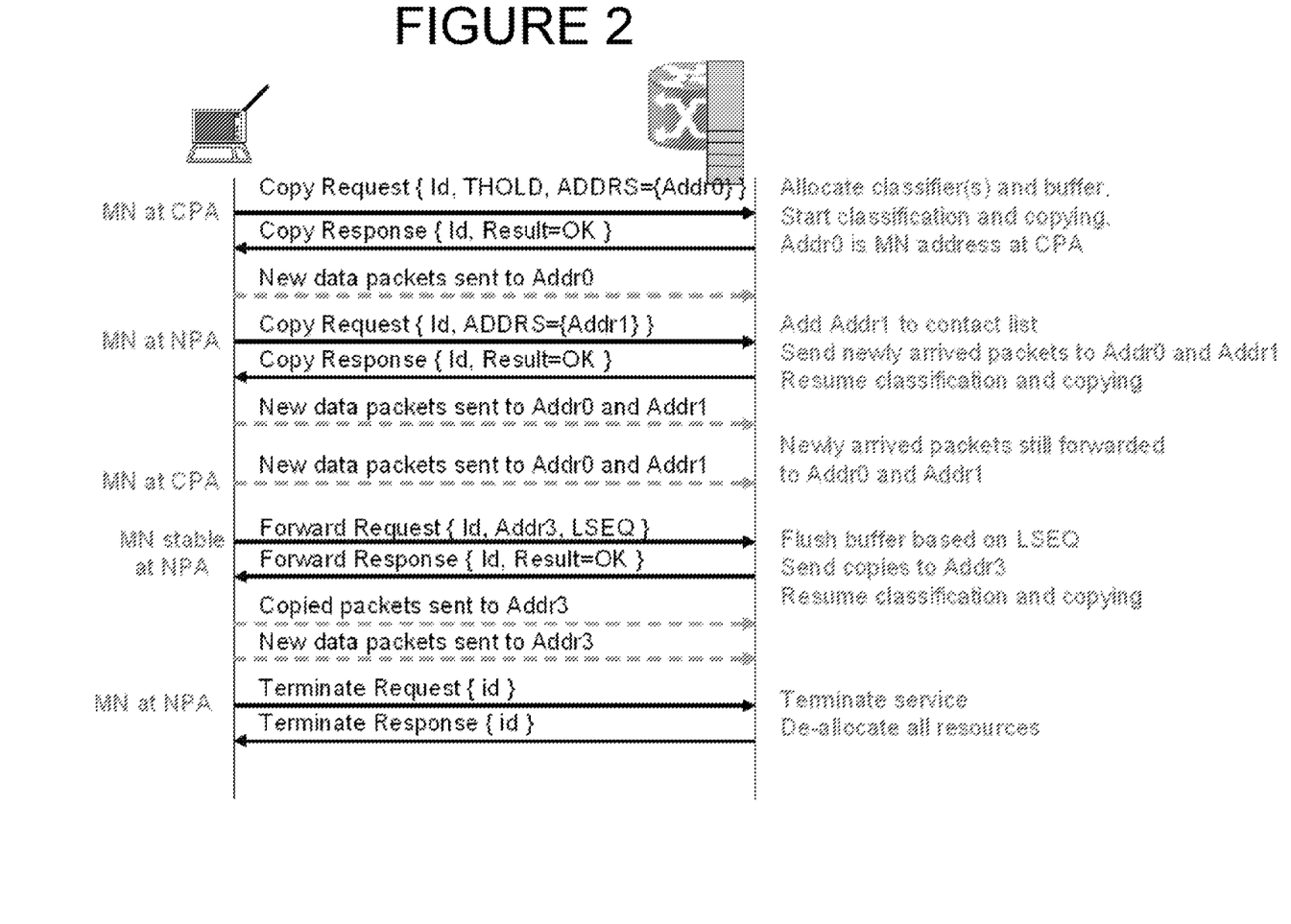
FIG. 2 is a diagrammatic representation of CPFW signaling when a ping-pong event occurs.

An example CPFW signaling where ping-pong event occurs is shown in FIG. 2. In this example, a copy request is sent by the MN when it is in the NPA. The contact address list is updated until the MN realizes it has a stable connection at NPA. At this point, the MN sends the forward request before sending a terminate request.

In link-layer CPFW (Sec 2.5), the contact address for the MN will likely not change and accordingly, bi-casting can be a matter of maintaining a list of bridged ports in the access device, instead of a list of MN addresses. If a forward request is received by a CPFW node, it can determine the bridge port from which the copy request signal came and use this to indicate the latest location of the MN. The access device can then forward newly arrived packets to all known bridge ports. In short, link-layer bi-casting can be done using port based methods instead of address based if the CPFW node needs to sends data frame to more than one bridged port to reach the NPA or CPA. However, this scheme is limited to restrictions applied by link-layer protocols such as STP (spanning-tree-protocol).

2.4.3. Packet Duplication

There is a possibility that packet duplication can occur on the MN if THOLD is relatively large compared to the handoff period. In this case, it is more likely that the oldest packets stored the buffer has already been received by the MN prior to start of the handoff. When forwarding happens, previously received packets will be received by the MN if all packets in the buffers are forwarded.

2.4.3.1. Prevention of Transmission of Duplicate Packets

It is normally difficult to provide solutions for avoiding transmission of duplicate packets at CPFW or detecting receipt of duplicate packets at MN in such scenarios unless the packets themselves contains sequencing information. If sequencing information is present, i.e. RTP, IPsec sequence numbers, even Identification field of IP header in some cases, then the CPFW service can take advantage of such information. The MN can determine the sequence number of the last receive packet (LSEQ) while in the CPA network and provide this information to the CPFW node in the forward request. The CPFW node can then start to forward packets starting from LSEQ+1. This helps prevent packet duplication in the MN and also lessens the amount of packets that needs to get forwarded. Packets that have less than LSEQ can be discarded at the CPFW since they are considered duplicates.

It is important to note that the type of the sequencing information to be used is either dynamically negotiated by the MN and CPFW node or administratively defined. It is left to the implementation and deployment scenario to provide details in determining the type and method used to determine the sequence information.

2.4.3.2. Detecting Receipt of Duplicate Packets

The same sequence number information in 2.4.3.1 can be used to detect duplicate packets in the MN. Additional entities in the MN maybe defined to implement this detection method and discard any duplicate packets. In the case that sequencing information cannot be determined, then the MN can rely on existing protocols to provide duplicate detection. Normally, this functionality is already present in prevalent protocols such as TCP. In some instances, this functionality is provided by the applications themselves such those that uses RTP (Real-time Transport Protocol). Therefore, the receipt of duplicate packets can be solved by multiple methods independent of the CPFW service.

2.4.3.3. Packet Loss Prevention During Classifying and Copying

An additional benefit of using sequence information is that the MN can detect whether packet loss has occurred up to LSEQ sequence number. If one or more packets has been lost along the path from the CPFW to the MN and the copy of those packets are still in the buffer, the MN can send a list of the missing packets with sequence numbers less than LSEQ (MissingSEQ) in the forward request. The CPFW node can then send set of missing packets in addition to packets with sequence numbers greater than LSEQ during forwarding. Note that only the MN or its application can determine MissingSEQ numbers and it can only go as far back as LSEQ-THOLD (Sec 3.2.2). The MissingSEQ parameter is optional and is only possible if both MN and CPFW node can determine and agree upon the sequence number of the packets.

2.5. CPFW in Link-Layer

Figure 3:
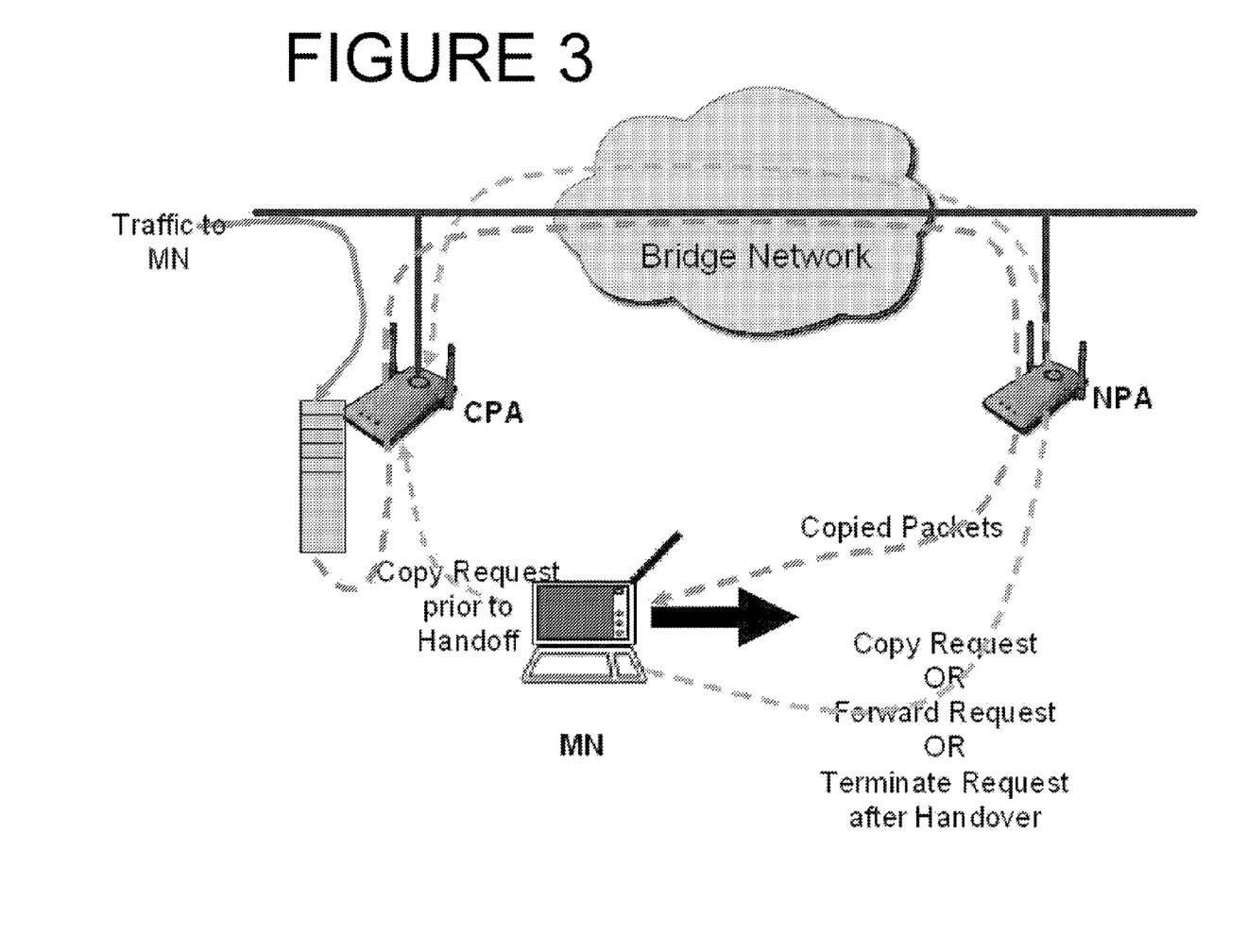
FIG. 3 is a diagrammatic representation of a deployment scenario in which CPFW resides in an access point.

CPFW can be deployed as a link-layer service to access devices such as access points, bridge, base stations etc. Unlike in the IP base CPFW where reachability of the CPA can cross the access media and even administrative domains, link-layer CPFW is normally bounded to the domain of the access media, i.e. domain of a bridged network. Therefore, CPFW service in link-layer normally applies to intra-LAN mobility where the access devices are inter-connected within the LAN. An example deployment scenario when CPFW resides in an access point is shown in FIG. 3. The classifier(s) and buffers are hosted in the 802.11 access point with and the signaling and forwarding are done within the distributed system (DS). The copy and forward request can be piggybacked into mechanisms such as inter access point protocol (IAPP, 802.11f) or some other means.

In link-layer CPFW, the copy-and-forward mechanism remains the same with the signaling and packet forwarding occurring at frame level. This implies that the CPA is reachable at link-layer from the MN while in NPA. The contact address of the MN is based on its MAC address and does not change regardless of movement. Assuming that the media is shared (Ethernet or WLAN), the reachability of the MN is not compromised after every movement, as long as it attaches to access devices inter-connected within the LAN. However, reachability of the MN's MAC address when there are bridge devices between CPA to NPA, may require address location updates to link-layer protocol such as STP (spanning-tree-protocol) to ensure reachability. Such updates can be triggered when the MN attaches to an access device, i.e. as part of the association/authentication mechanisms in 802.11 access points.

3. CPFW Service

3.1. Statemachine

Figure 4:
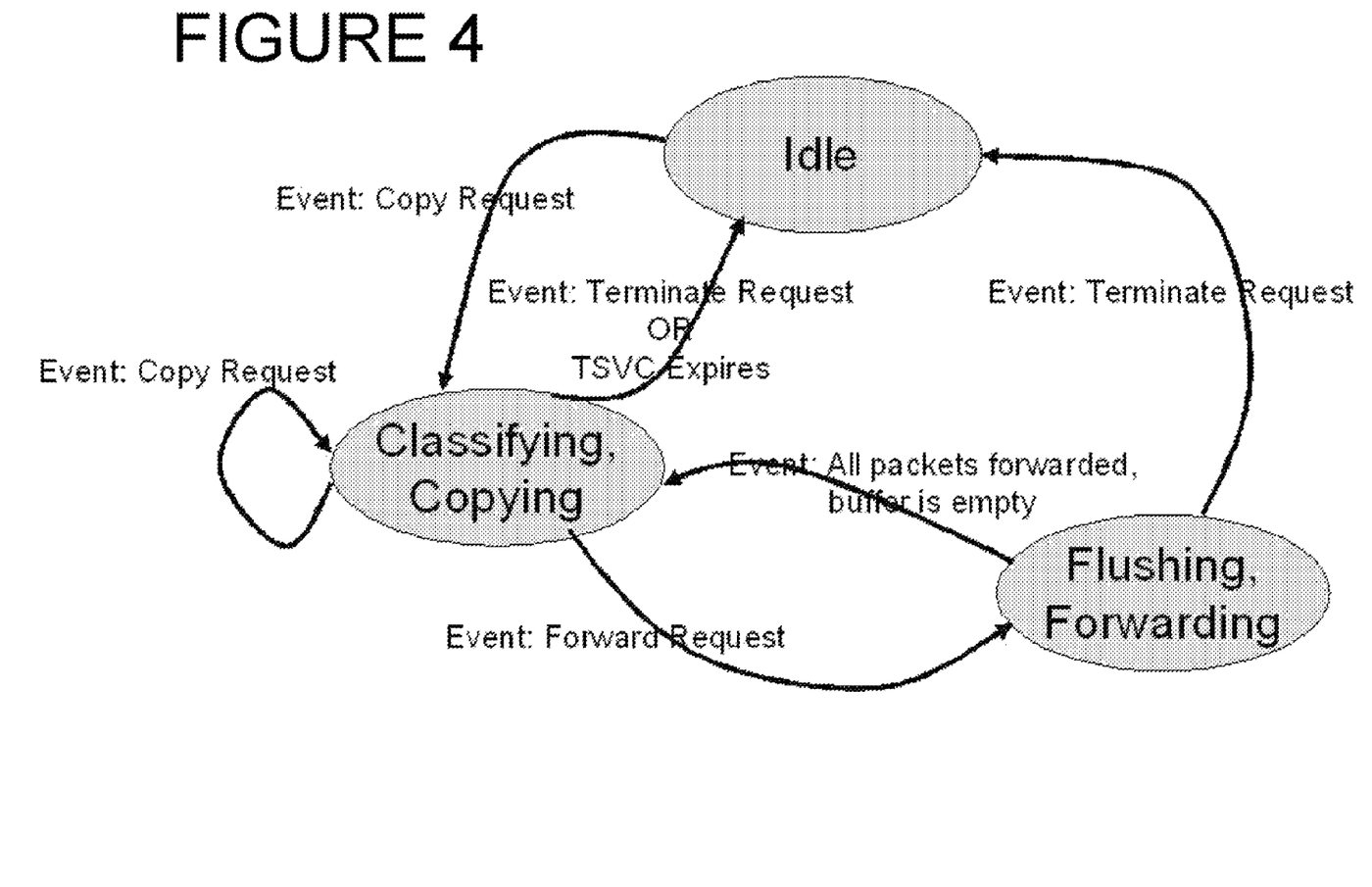
FIG. 4 is a diagrammatic representation of CPFW statemachine.

The CPFW statemachine as shown in FIG. 4, is simple and should be implemented only in the CPFW node. It is also passive and reacts only to signals sent by the MN (Sec 3.2). The MN itself will not maintain any state except for its Id (Sec 3.2.2) and only sends signals based on certain handoff conditions. The CPFW statemachine has the following three (3) states:

3.1.1. Idle

Resource for providing CPFW service to an MN including packet buffer and statemachine will be freed and no additional actions are taken. A valid event affecting this state is:

a. CPFW node receives a copy request signal from an MN. This will result in transition to Classifying and Copying (Sec 3.1.2). Copy request signal may contain THOLD parameter that the CPFW node can store.

3.1.2. Classifying and Copying

Allocates packet buffer and start packet the classifier(s). All packets passing classification will be immediately copied to the buffer. Valid events affecting this state are:

a. CPFW node receives a forward request signal from an MN. This will result in immediate state transition to flushing and forwarding (Sec 3.1.3). The forward request signal should contain the contact address of the MN in the NPA.

b. TSVC expiration. Service period expiration will result in the termination of the CPFW service and cause an immediate transition to Idle state (Sec 3.1.1). This is a catch-all way of terminating CPFW service in case the MN is never heard from again.

c. CPFW node receives a termination request. This will result in the termination of the CPFW service. All packets stored in the buffer will be discarded and state will transition to Idle. This has the same effect as (b).

d. CPFW node receives copy request signal. This provides a hint to the CPFW node that the MN wishes to have bi-casting support. The CPFW will then start to maintain a list of the MNs contact addresses. Receipt of subsequent copy request will not cause transitions to another state. It will be used only to maintain the MNs contact address list (Sec 2.4.2).

3.1.3. Flushing and Forwarding

Packet copying is temporarily stopped and any packets stored in the buffers are forwarded to the MN at its contact address(es). Valid events affecting these states are:

a. All packets have been forwarded and buffer is empty. This indicates packets have been flushed and result in an immediate transition to classifying and forwarding (Sec 3.1.1).

b. CPFW node receives a termination request. This will result in the termination of the CPFW service. Any remaining packets stored in the buffer will be discarded and state will transition to Idle.

3.2. Signals and Message Formats

There are only three (3) request signals used by the CPFW service. Each request has a corresponding response signal. Request signals are generated by the MN and processed by the CPFW statemachine. Response signals are sent by the CPFW node ask acknowledgement of the preceding request. Normally, these signals can be sent as a link-layer frame to a CPFW node or it can be encapsulated in a UDP packet and sent to a well known port used by the CPFW node. However, these messages can also be encapsulated in existing protocols that allow piggybacking of opaque data. It maybe the mobility management protocols themselves that carry these signals if the CPFW resides in the HA for example. Or perhaps the authentication protocols such as PANA [13] that can forward the signals to an AR. Because of the simplicity of the signals, it is recommended that the later approach is taken (incorporation into existing protocols).

3.2.1. Copy Request

An MN wishing to obtain CPFW service will send a copy request signal in the following format:

CPR={THOLD, ADDRS} where the CPR carries at least the following parameters:

THOLD—Maximum number of packets to copy. Provided as a hint to the CPFW node and can be used to imply the length of the handover period.

ADDRS—List of current contact addresses of the MN in the CPA or NPA. Each address in this parameter can contain a flag indicating whether the address is new and should be added to the contact list maintained by the CPFW or that the address is no longer valid and should be removed from that list (Sec 2.4).

3.2.2. Copy Response

This signal is sent by the CPFW node in response to a copy request.

CPA={Id, Result} where the CPA carries at least the following parameters:

Id—A value that can be used to uniquely identify the MN in the CPFW service. The value has to be unique in the context of the CPFW node providing the service. All request signals generated by the MN must use this value.

Result—Indicates whether the CPFW node can comply with the previous copy request sent by the MN. Values indicating success or failure are left up to the implementation. If the copy response is sent in response to the initial copy request and CPFW can accommodate the request, the 'Id' parameter must be present. If the CPFW is unable to comply with the initial request then no service will be provided. If the CPFW is unable to comply with subsequent copy request, then the CPFW cannot provide bi-casting service.

3.2.3. Forward Request

An MN wishing to notify the CPFW node of a successful handover can send a forward request. If a CPFW node does not receive a forward request before TSVC expires, it will consider that handoff has failed and release all resource regarding the service.

FWDR={Id, Addr, LSEQ, MissingSEQ} where the FWDR carries at least the following parameters:

Id—This value must match the value sent in the initial copy response.

Addr—The new contact address of the MN after handover. This address could be the new IP address in the NPA network.

LSEQ—Last known sequence number received by the MN prior to handoff. This is an optional parameter used by the CPFW service to convey sequencing information used in forwarding (Sec 2.4)

MissingSEQ—This is an optional parameter that indicates the set of sequence numbers determined by the MN to be missing. If one or more of these packets are buffered in the CPFW node then it can send these packets along with packets LSEQ and greater.

3.2.4. Forward Response

This signal is sent by the CPFW node in response to a forward request.

FWDA={Id, Result} where the FWDA carries at least the following parameters:

Id—This value must match the value sent in the initial copy response.

Result—Indicates whether the CPFW node can comply with the previous forward request sent by the MN. Values indicating success or failure are left up to the implementation. If unsuccessful, CPFW node indicates that forwarding has failed. The MN can attempt to send a forward request again or the MN can terminate the service.

3.2.5. Terminate Request

An MN wishing to terminate the CPFW service at any state should send a terminate request signal to the CPFW node. The CPFW node upon receiving this signal should immediately transition to idle state and release all resources and states related to the service.

TERMR={Id}

Id—This value must match the value sent in the initial copy response.

3.2.6. Terminate Response

This signal is sent by the CPFW node in response to a forward request.

TERMA={Id} where the TERMA carries at least the following parameters:

Id—This value must match the value sent in the initial copy response.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to."

In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example".

What is claimed is:

1. A method of handing off without packet loss, a mobile device traveling from a current point of attachment to a new point of attachment, comprising:

providing a copy and forward module in a current point of attachment, said copy and forward module copying packets that are being transmitted to a mobile node and storing the copied packets while said mobile node is in transition from said current point of attachment to said new point of attachment, wherein said copy and forward module makes copies of said packets that are being transmitted while allowing the original packets that are being transmitted to flow without buffering, further including said copy and forward module communicating with the mobile node for the copy and forward services using a protocol that is independent of mobility management protocols such that the copy and forward services are generic and independent of mobility management protocols, and further including upon receipt of a copy request from a mobile node, if copy and forward service can be accommodated by said copy and forward module then said copy and forward module transmits a unique ID parameter to said mobile node within a copy response for use by the mobile node in subsequent messages.

2. The method of claim 1, wherein said copy and forward module forwards during handover, copied packets.

3. The method of claim 2, wherein the destination IP address of copied packets is the mobile nodes' IP address at its new point of attachment.

4. The method of claim 3, further comprising the step of said copy and forward module bi-casting packets to both the current point of attachment and the new point of attachment of said mobile node.

5. The method of claim 1, where after receipt of a forward request and while forwarding packets, the copy and forward module continues to receive packets for said mobile node, and wherein said copy and forward module forwards packets stored in the buffer at a higher priority than the priority set for newly classified packets.

6. The method of claim 1, wherein said mobile node sends a plurality of copy requests to said current point of attachment and said copy and forward module bi-casts packets to a plurality of points of attachment.

7. The method of claim 1, wherein upon completion of handover, the step of said mobile node sending a forward request signal to said copy and forward module, signally signalling said copy and forward module to forward copied packets to said mobile node's new point of attachment.

8. The method of claim 1, wherein said current point of attachment network continues to receive packets for the mobile node after successful handover has occurred and a forward request has been sent by said mobile node to said copy and forward module, said copy and forward module continues to classify and copy packets and copied packets as well as any newly arrived packets are forwarded to a new contact address provided by said mobile node in said forward request, and wherein said classifying, copying, and forwarding continues until said copy and forward module receives a terminate request or upon expiration of a predetermined service expiration period of time.

9. The method of claim 1, further including the copy and forward module providing packet classification or packet sequence detection.

10. A method of handing off without packet loss, a mobile device traveling from a current point of attachment to a new point of attachment, comprising:

providing a copy and forward module in a current point of attachment, said copy and forward module copying and storing packets that are being transmitted to a mobile node while said mobile node is in transition from said current point of attachment to said new point of attachment;

wherein said copy and forward module copies packets destined for the mobile node prior to handoff and then forwards the copied packets to said mobile node when handover is completed and the mobile node is reachable in the new point of attachment network, wherein said copy and forward module makes copies of said packets that are being transmitted while allowing the original packets that are being transmitted to flow without buffering;

further including prior to handoff said copy and forward module receiving from said mobile node a copy request for said copy and forward module for copy and forward services;

further including in response to said copy request, said copy and forward module copying packets destined for said mobile node on said current point of attachment and sending a copy response to said mobile node notifying said mobile node as to the availability of the copy and forward services;

further including after handoff of said mobile node to the new point of attachment, said copy and forward module receiving from said mobile node a forward request for the copy and forward module to forward copied packets.

11. The method of claim 10, further including said copy and forward module transmitting a unique ID parameter to said mobile node within said copy response, which parameter is used by said mobile node in subsequent messages.

12. The method of claim 10, wherein said copy and forward module is provided within an access router within a current network and where the copy and forward messaging is between said access router and said mobile node.

13. A method of handing off without packet loss, a mobile device traveling from a current point of attachment to a new point of attachment, comprising:

providing a copy and forward module, said copy and forward module copying and storing packets that are being transmitted to a mobile node while said mobile node is in transition from said current point of attachment to said new point of attachment;

wherein said copy and forward module copies packets destined for the mobile node prior to handoff and then forwards the copied packets to said mobile node when handover is completed and the mobile node is reachable in the new point of attachment network;

wherein the destination IP address of copied packets is the mobile nodes' IP address at its new point of attachment;

where said copy and forward module maintains a list of addresses as the last known contact addresses of the mobile node, said mobile node's initial copy request contains an initial contact address of said mobile node and subsequent copy requests are used to add or delete addresses to said list, said subsequent copy request carrying a per-address flag to indicate whether the address is to be added or deleted from said list, and wherein newly arrived packets are bi-cast to said mobile node's last known contact addresses.

14. A method of handing off without packet loss, a mobile device traveling from a current point of attachment to a new point of attachment, comprising:

providing a copy and forward module, said copy and forward module copying and storing packets that are being transmitted to a mobile node while said mobile node is in transition from said current point of attachment to said new point of attachment;

wherein said copy and forward module copies packets destined for the mobile node prior to handoff and then forwards the copied packets to said mobile node when handover is completed and the mobile node is reachable in the new point of attachment network;
wherein said mobile node requests copy and forward service from the current point of attachment,
said mobile node sends a copy request signal to said copy and forward module, thereby signaling the intent to use copy and forward service prior to handoff,
upon receiving said copy request, said copy and forward module determines whether it will be able to accommodate said mobile node's request,
if said copy and forward module is able to accommodate said copy request, said copy and forward module commences to copy packets destined for said mobile node on said current point of attachment, said copy and forward module sends a copy response to said mobile node notifying said mobile node of said copy and forward module's intent to either provide or to not provide service to said mobile node, and
said current point of attachment forwards original packets to said mobile node, irrespective of whether said copy and forward module is able to accommodate said copy request.

15. The method of claim 14, wherein if said copy-and-forward service can be accommodated by said copy and forward module, then said copy response signal contains an Id parameter generated by copy and forward module to uniquely identify each mobile node for which said copy and forward module is providing service.

16. The method of claim 15, wherein said mobile node uses said Id in subsequent request messages to identify itself to said copy and forward module.

17. A method of handing off without packet loss, a mobile device traveling from a current point of attachment to a new point of attachment, comprising:
providing a copy and forward module, said copy and forward module copying and storing packets that are being transmitted to a mobile node while said mobile node is in transition from said current point of attachment to said new point of attachment;
wherein upon completion of handover, the step of said mobile node sending a forward request signal to said copy and forward module, signalling said copy and forward module to forward copied packets to said mobile node's new point of attachment;
wherein said copy and forward module notifies said mobile node that it has received the forward request by sending a forward response signal to said mobile node, and wherein upon receipt of a forward request signal said copy and forward module forwards copied packets and wherein a grace period is provided for left over packets destined for the mobile node to be forwarded to said new point of attachment until such time that copy and forward service is terminated.

18. The method of claim 17, wherein said mobile nodes sends a service termination request signal to terminate copy and forward service and wherein said termination request signal is used during flushing and forwarding thereby indicating to said copy and forward module that said mobile node has received enough packets and that the copy and forward module is to terminate the copy and forward service.

19. The method of claim 17, wherein said mobile nodes fails to send a service termination request signal to terminate copy and forward service a service expiration timer terminates said copy and forward service, said service expiration being the maximum duration that applications in the mobile node can tolerate un-reachability.

20. A method of handing off without packet loss, a mobile device traveling from a current point of attachment to a new point of attachment, comprising:
providing a copy and forward module, said copy and forward module copying and storing packets that are being transmitted to a mobile node while said mobile node is in transition from said current point of attachment to said new point of attachment;
wherein said mobile node moves from a current point of attachment, to a new point of attachment, and then to an alternate point of attachment, and sends a further copy request to notify the copy and forward module of its new contact address in its newly established current point of attachment, and wherein upon stabilization of the mobile node's connection in the current point of attachment, the new point of attachment, or an alternate point of attachment, said mobile node sends a forward request to said copy and forward module, and said copy and forward module flushes all copied packets to point of attachment address sent by said mobile node to said copy and forward module in association with said forward request.

21. The method of claim 20, wherein the maximum number of packets that can be stored in a packet buffer in said copy and forward module is sufficiently large to accommodate said mobile node moving a plurality of times subsequent to moving from said current point of attachment to a new point of attachment, and wherein said buffer is a first-in, first-out buffer which, when full the receipt of new packet that need to be copied results in the eldest packets being discarded to make room for new packets, such that said packet buffer always contain the latest set of packets for said mobile node, up to said maximum number of packets.

22. The method of claim 21, wherein said stored packets includes sequencing information, and wherein said mobile node determines the sequence number of the last received packet while in the current point of attachment network and provides this information in association with the forward request to the copy and forward module, said copy and forward module forwarding packets starting from the last received packet plus one, and discards packets that are less than the sequence number of the last received packet.

23. The method of claim 22, further comprising said mobile node detecting whether packet loss has occurred up to the sequence number of the last received packet, comprising said mobile node sending to said copy and forward module a forward request including a list of missing packets with sequence numbers less than the sequence number of the last received packet in the forward request and said copy and forward module sending a set of missing packets in addition to packets with sequence numbers greater than the sequence number of the last received packet during forwarding.

24. The method of claim 22, further comprising said copy and forward module detecting whether packet duplication has occurred up to the sequence number of the last received packet, comprising said copy and forward module receiving a forward request with sequence number of the last received packet and said copy and forward module sending the set of packets with sequence numbers greater than the sequence number of the last received packet during forwarding.

25. The method of claim 20, wherein the alternate point of attachment includes the current point of attachment.

* * * * *

UNITED STATES PATENT AND TRADEMARK OFFICE
CERTIFICATE OF CORRECTION

| | |
|---|---|
| PATENT NO. | : 7,936,719 B2 |
| APPLICATION NO. | : 11/379565 |
| DATED | : May 3, 2011 |
| INVENTOR(S) | : Fajardo et al. |

It is certified that error appears in the above-identified patent and that said Letters Patent is hereby corrected as shown below:

On the Title Page, in Item (56), under "OTHER PUBLICATIONS", in Column 2, Line 1, delete "Buffereing" and insert -- Buffering --, therefor.

On the Title Page, in Item (74), under "Attorney, Agent, Or Firm", in Column 2, Line 1, delete "Watch Stone" and insert -- WatchStone --, therefor.

On Title Page 2, in Item (56), under "OTHER PUBLICATIONS", in Column 2, Line 1, delete "Pre-Authenthication" and insert -- Pre-Authentication --, therefor.

On Title Page 2, in Item (56), under "OTHER PUBLICATIONS", in Column 2, Line 8, delete "Krishnamuthi," and insert -- Krishnamurthi, --, therefor.

In the Specification

In Column 2, Line 42, delete "(WLANS)" and insert -- (WLANs) --, therefor.

In Column 5, Line 57, delete "list," and insert -- list. --, therefor.

In Column 10, Line 12, delete "c." and insert -- e. --, therefor.

In Column 10, Line 49, delete "More that" and insert -- More than --, therefor.

In Column 13, Line 33, delete "TSCV" and insert -- TSVC --, therefor.

In Column 13, Line 40, delete "CFPW" and insert -- CPFW --, therefor.

In the Claims

In Column 19, Lines 41-42, in Claim 7, delete "signally signalling" and insert -- signalling --, therefor.

Signed and Sealed this
Twentieth Day of January, 2015

Michelle K. Lee
*Deputy Director of the United States Patent and Trademark Office*